United States Patent
Huo et al.

(10) Patent No.: US 12,556,375 B2
(45) Date of Patent: Feb. 17, 2026

(54) PROTECTING USER DATA DURING VIRTUAL MACHINE INITIALIZATION

(71) Applicant: International Business Machines Corporation, Armonk, NY (US)

(72) Inventors: Qi Feng Huo, Beijing (CN); Yuan Yuan Wang, Beijing (CN); Da Li Liu, Beijing (CN); Yan Song Liu, Beijing (CN); Lei Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 17/822,864

(22) Filed: Aug. 29, 2022

(65) Prior Publication Data

US 2024/0072997 A1 Feb. 29, 2024

(51) Int. Cl.
*H04L 9/08* (2006.01)
*G06F 9/455* (2018.01)

(52) U.S. Cl.
CPC ........ *H04L 9/0825* (2013.01); *G06F 9/45558* (2013.01); *H04L 9/0891* (2013.01); *G06F 2009/45587* (2013.01)

(58) Field of Classification Search
CPC . H04L 9/0825; H04L 9/0891; G06F 9/45558; G06F 2009/45587
See application file for complete search history.

(56) References Cited

U.S. PATENT DOCUMENTS

| 9,083,510 | B1 | 7/2015 | Lakshman et al. | |
|---|---|---|---|---|
| 9,626,166 | B1 | 4/2017 | Alewine et al. | |
| 2009/0064292 | A1* | 3/2009 | Carter | G06F 21/33 718/1 |
| 2013/0061293 | A1* | 3/2013 | Mao | G06F 21/53 726/4 |
| 2014/0032920 | A1* | 1/2014 | Gehrmann | G06F 21/57 713/168 |
| 2014/0075522 | A1* | 3/2014 | Paris | G06F 21/575 726/5 |
| 2015/0188927 | A1* | 7/2015 | Santhi | G06Q 10/0631 726/4 |
| 2015/0319160 | A1* | 11/2015 | Ferguson | H04L 63/12 726/10 |
| 2021/0004479 | A1 | 1/2021 | Ithal et al. | |

OTHER PUBLICATIONS

Quiring, "Automate the Encryption of a Virtual Server Image for Deployment onto Classic Infrastructure," IBM Cloud Blog, Sep. 20, 2019, accessed May 30, 2022, 16 pages. https://www.ibm.com/cloud/blog/automate-the-encryption-of-a-virtual-server-image-for-deployment-onto-classic-infrastructure.

(Continued)

*Primary Examiner* — Mohamed A. Wasel
(74) *Attorney, Agent, or Firm* — Yee & Associates, P.C.

(57) ABSTRACT

User data security is provided. Encrypted user data are identified in a virtual machine. A private key of a public/private cryptographic key pair corresponding to a user is retrieved. The encrypted user data is decrypted within the virtual machine utilizing the private key corresponding to the user to form decrypted user data. The encrypted user data are replaced in the virtual machine with the decrypted user data. The decrypted user data is processed in the virtual machine to perform a service in a cloud environment.

20 Claims, 4 Drawing Sheets

(56) References Cited

OTHER PUBLICATIONS

"AWS Security Best Practices," AWS, Amazon Web Services, Inc., Aug. 2016, 76 pages. https://d1.awsstatic.com/whitepapers/Security/AWS_Security_Best_Practices.pdf.

Namer, "How to Protect Data at Rest with Amazon EC2 Instance Store Encryption," AWS Security Blog, Jan. 30, 2017, accessed May 30, 2022, 9 pages. https://aws.amazon.com/blogs/security/how-to-protect-data-at-rest-with-amazon-ec2-instance-store-encryption/.

"HP Atalla Cloud Encryption," Data Sheet, Hewlett-Packard Development Company, L.P., copyright 2014, accessed May 30, 2022, 4 pages. http://www.cnmeonline.com/myresources/hpe/docs/HP_Atalla_DataSheets_HPAtallaCloudEncryption.pdf.

"Protecting sensitive data in the cloud," ZDNet, a Red Ventures Company, copyright 2022, accessed May 30, 2022, 5 pages. https://www.zdnet.com/paid-content/article/protecting-sensitive-data-in-the-cloud/.

* cited by examiner

PROTECTING USER DATA DURING VIRTUAL MACHINE INITIALIZATION

BACKGROUND

1. Field

The disclosure relates generally to data security and more specifically to protecting sensitive user data used for virtual machine initialization in a cloud environment.

2. Description of the Related Art

Data security means protecting digital data, such as, for example, sensitive user data from unauthorized access. Data security typically involves preventing or decreasing the probability of unauthorized access by unauthorized users (e.g., malicious users and the like) by reducing security incidents. Data security is balanced protection of confidentiality, integrity, and availability of data, without hampering entity productivity. An entity may be, for example, an enterprise, company, business, organization, institution, agency, group, individual, or the like.

SUMMARY

According to one illustrative embodiment, a computer-implemented method for user data security is provided. A computer identifies encrypted user data in a virtual machine. The computer retrieves a private key of a public/private cryptographic key pair corresponding to a user. The computer decrypts the encrypted user data within the virtual machine utilizing the private key corresponding to the user to form decrypted user data. The computer replaces the encrypted user data in the virtual machine with the decrypted user data. The computer processes the decrypted in the virtual machine to perform a service in a cloud environment. According to other illustrative embodiments, a computer system and computer program product for user data security are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
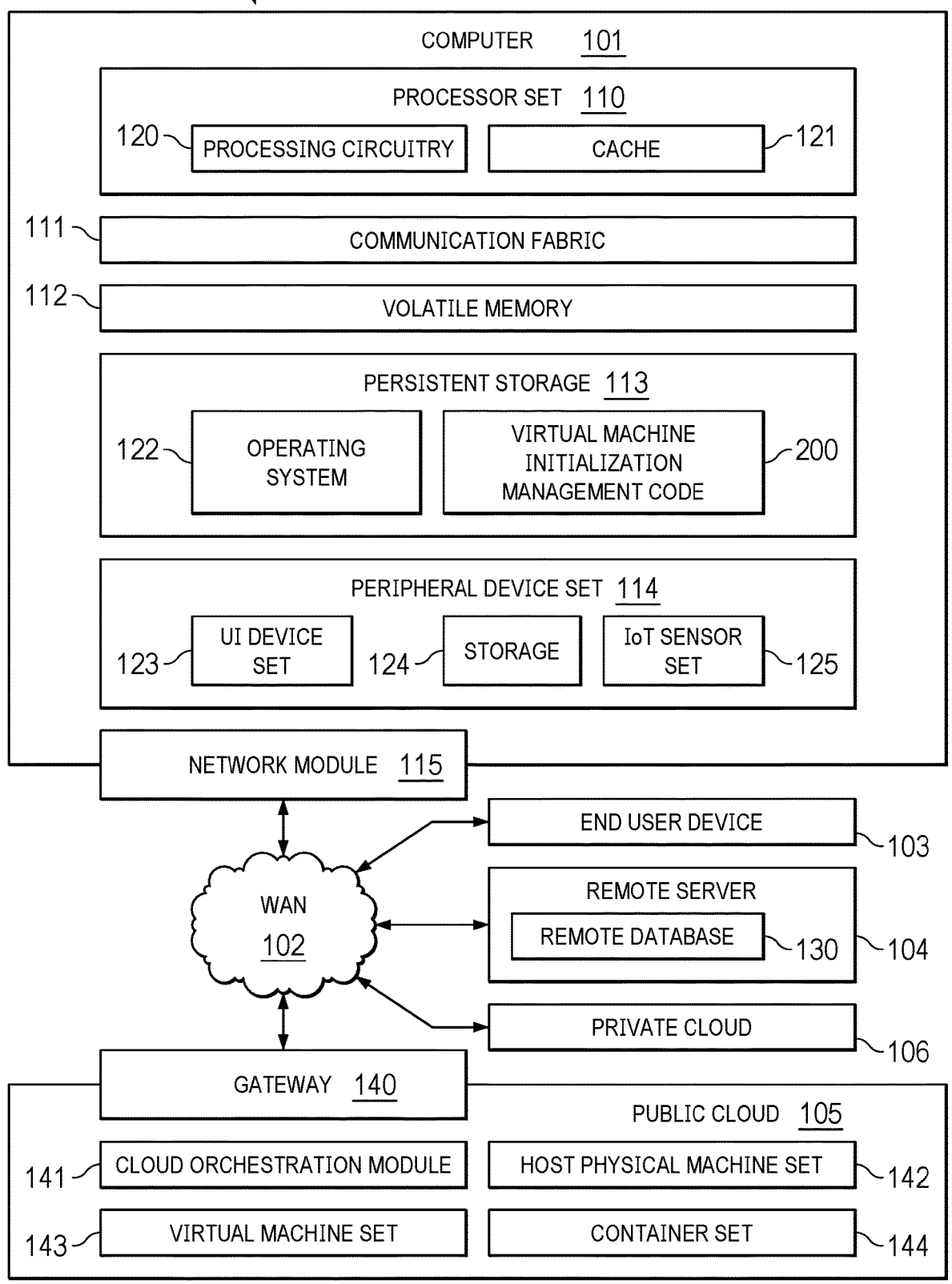
FIG. 1 is a pictorial representation of a computing environment in which illustrative embodiments may be implemented.
Figure 2:
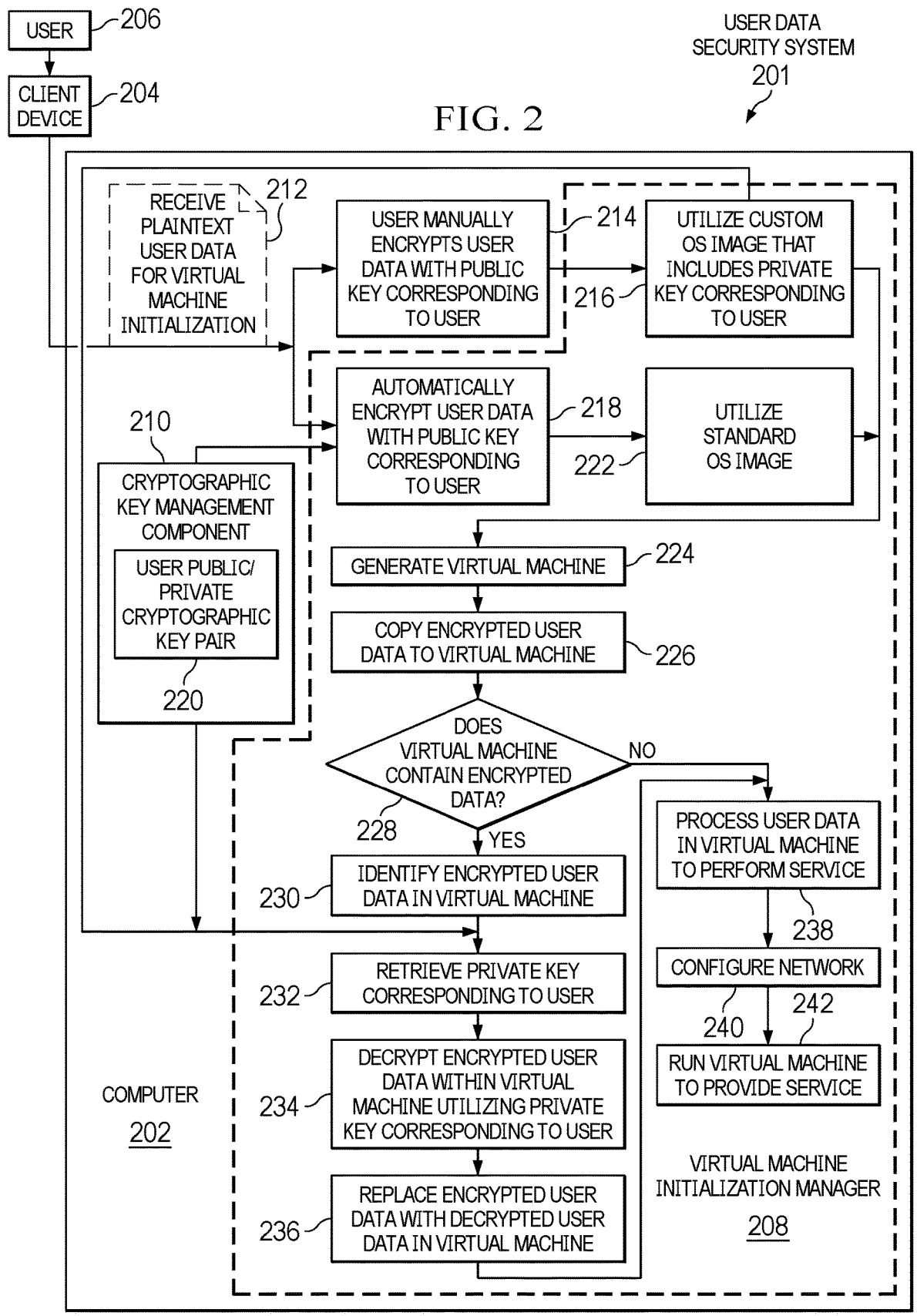
FIG. 2 is a diagram illustrating an example of a user data security system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as virtual machine initialization management code 200. Virtual machine initialization management code 200 protects user data during virtual machine initialization to prevent unauthorized access and tampering of the user data. In addition to virtual machine initialization management code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and virtual machine initialization management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in virtual machine initialization management code block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The virtual machine initialization management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Virtual machine initialization can be automatically performed by a software component, such as, for example, cloud-init, that automates the initialization of virtual machines during operating system boot of a cloud computing platform. Cloud-init is an industry standard for cross-platform virtual machine initialization. Cloud-init is supported by most public cloud providers, provisioning systems for private cloud infrastructure, and bare-metal installations.

A user can configure cloud-init to perform a variety of tasks. Tasks that cloud-init can perform include, for example, configuring a host name, configuring authorized secure shell protocol keys, installing software packages on virtual machines, running scripts, calling external uniform resource locators, and the like. However, it should be noted that cloud-init is meant as an example only and not as a limitation on illustrative embodiments. In other words, illustrative embodiments can utilize any type of virtual machine initialization code or software.

Currently, cloud providers process user data for generating a virtual machine in a cloud environment as plaintext (e.g., a YAML file that is in a human-readable text format used to define the configuration of the virtual machine). However, it is easy for an unauthorized user to access this plaintext user data during initialization of the virtual machine. As a result, after accessing the plaintext user data, the unauthorized user can, for example, alter the user data, inject a virus into the user data, or the like. Thus, current solutions do not provide adequate security for the plaintext user data used to initialize the virtual machine.

Illustrative embodiments protect the sensitive user data utilized for virtual machine initialization by encrypting the plaintext user data prior to initializing the virtual machine. For example, the user can manually encrypt the plaintext user data utilizing a public key of a public/private cryptographic key pair corresponding to the user and provide the encrypted user data to the cloud provider to initialize the virtual machine in the cloud environment. In this scenario where the user encrypts the user data, the cloud provider is unaware of the contents of the user data.

Alternatively, the user provides the plaintext user data to the cloud provider to initialize the virtual machine in the cloud environment. A computer of the cloud provider automatically encrypts the plaintext user data utilizing the public key of the public/private cryptographic key pair corresponding to the user. It should be noted that the user previously stored the public/private cryptographic key pair in a cryptographic key management component or system and the computer securely retrieved the public key from the cryptographic key management component to encrypt the user data.

In response to the user manually encrypting the plaintext user data, illustrative embodiments select a custom operating system image that includes a private key of the public/private cryptographic key pair corresponding to the user to generate the virtual machine in the cloud environment. It should be noted that the user provides the custom operating system image. Alternatively, in response to the cloud provider automatically encrypting the plaintext user data, illustrative embodiments select a standard or default operating system image to generate the virtual machine. It should be noted that the cloud provider of the cloud environment provides the standard operating system image. Illustrative embodiments then generate the virtual machine utilizing the selected operating system image. Further, illustrative embodiments copy the encrypted user data to the generated virtual machine.

Illustrative embodiments identify and decrypt the encrypted user data within the generated virtual machine utilizing the private key of the public/private cryptographic key pair corresponding to the user. Illustrative embodiments securely retrieve the private key corresponding to the user either from the cryptographic key management component when illustrative embodiments generate the virtual machine utilizing the standard operating system image provided by the cloud provider or from a filesystem of the virtual machine when illustrative embodiments generate the virtual machine utilizing the custom operating system image, which includes the private key, provided by the user. The custom operating system image copies the private key to a file system of the virtual machine during generation of the virtual machine. Illustrative embodiments then decrypt the encrypted user data utilizing the retrieved private key corresponding to the user. Illustrative embodiments replace the encrypted user data in the virtual machine with the decrypted user data.

Afterward, illustrative embodiments process the decrypted user data in the virtual machine to perform a service in the cloud environment. In addition, illustrative embodiments configure a network for the service. Subsequently, illustrative embodiments run the virtual machine in the cloud environment to provide the service. It should be noted that illustrative embodiments can be used in any virtual machine initialization process by any cloud provider.

As a result, illustrative embodiments protect sensitive user data from unauthorized access during virtual machine initialization. In addition, illustrative embodiments can decrypt the encrypted user data in any stage of the virtual machine initialization boot process. Consequently, illustrative embodiments are more flexible than current encryption methods and can control the virtual machine initialization boot process.

Thus, illustrative embodiments provide one or more technical solutions that overcome a technical problem with protecting user data during virtual machine initialization to prevent unauthorized access and tampering of the user data. As a result, these one or more technical solutions provide a technical effect and practical application in the field of data security.

With reference now to FIG. 2, a diagram illustrating an example of a user data security system is depicted in accordance with an illustrative embodiment. User data security system 201 may be implemented in a computing environment, such as computing environment 100 in FIG. 1. User data security system 201 is a system of hardware and software components for protecting user data during virtual machine initialization in a cloud environment to prevent unauthorized access and tampering of the user data. The cloud environment may be, for example, a public cloud, hybrid cloud, private cloud, community cloud, or the like.

In this example, user data security system 201 includes computer 202 and client device 204. Computer 202 and client device 204 may be, for example, computer 101 and end user device 103, respectively, in FIG. 1. However, it should be noted that user data security system 201 is intended as an example only and not as a limitation on illustrative embodiments. In other words, user data security system 201 may include any number of computers, client devices, and other hardware and software components not shown.

User 206 utilizes client device 204 to send user data in plaintext for initializing a virtual machine in the cloud environment. User 206 may be, for example, a program developer, a system administrator, or the like. The plaintext user data may be, for example, a YAML file.

Computer 202 is included in the cloud environment, which is managed by a cloud provider. Computer 202 includes virtual machine initialization manager 208 and cryptographic key management component 210. Virtual machine initialization manager 208 may be, for example, virtual machine initialization management code 200 in FIG. 1. Computer 202 utilizes virtual machine initialization manager 208 to control the process of protecting plaintext user data received from client devices. Cryptographic key management component 210 is responsible for securely storing and managing a plurality of public/private cryptographic key pairs corresponding to a plurality of different users. Cryptographic key management component 210 may include, for example, encrypted storage. In addition, even though cryptographic key management component 210 is shown as a component of computer 202, cryptographic key management component 210 may be a standalone component or system coupled to computer 202 via a network.

At 212, computer 202 receives the plaintext user data for virtual machine initialization in the cloud environment from client device 204. At 214, user 206 manually encrypts the plaintext user data with a public key corresponding to user 206. At 216, virtual machine initialization manager 208 utilizes a custom operating system image, which includes a private key corresponding to user 206, to generate the virtual machine in response to user 206 encrypting the plaintext user data. It should be noted that user 206 provides the custom operating system image with the private key via a secure application programming interface to virtual machine initialization manager 208. The secure application programming interface provides a secure communication channel between client device 204 and computer 202.

At 218, in response to user 206 not manually encrypting the plaintext user data, virtual machine initialization manager 208 automatically encrypts the plaintext user data with the public key corresponding to user 206. Virtual machine initialization manager 208 retrieved the public key corresponding to user 206 from user public/private cryptographic key pair 220, which user 206 previously stored in cryptographic key management component 210. At 222, in response to virtual machine initialization manager 208 automatically encrypting the plaintext user data, virtual machine initialization manager 208 utilizes a standard operating system image to generate the virtual machine in the cloud environment. It should be noted that the cloud provider of the cloud environment provides the standard operating system image.

At 224, virtual machine initialization manager 208 generates the virtual machine in the cloud environment utilizing one of the custom operating system image or the standard operating system image depending on whether user 206 manually encrypted the plaintext user data or whether virtual machine initialization manager 208 automatically encrypted the plaintext user data. It should be noted that when virtual machine initialization manager 208 generates the virtual machine utilizing the custom operating system image, which includes the private key of the user, the custom operating system image copies or inserts the private key of the user into a filesystem of the virtual machine for later use by virtual machine initialization manager 208 to decrypt the encrypted user data within the virtual machine. At 226, virtual machine initialization manager 208 copies the encrypted user data to the virtual machine.

At 228, virtual machine initialization manager 208 determines whether the virtual machine contains encrypted user data. In other words, virtual machine initialization manager 208 is capable of processing plaintext user data as well as encrypted user data. If virtual machine initialization manager 208 determines that the virtual machine does not contain encrypted user data (i.e., plaintext user data), then virtual machine initialization manager 208 proceeds to 238 to process the plaintext user data in the virtual machine to perform, for example, a service, task, function, or the like in the cloud environment.

Alternatively, if virtual machine initialization manager 208 determines that the virtual machine does contain encrypted user data, then, at 230, virtual machine initialization manager 208 identifies the encrypted user data in the virtual machine. In addition, at 232, virtual machine initialization manager 208 retrieves the private key corresponding to user 206 either from user public/private cryptographic key pair 220 in cryptographic key management component 210 in response to virtual machine initialization manager 208 utilizing the standard operating system image to generate the virtual machine or from the filesystem of the virtual machine in response to virtual machine initialization manager 208 utilizing the custom operating system image, which includes the private key of the user, to generate the virtual machine.

At 234, virtual machine initialization manager 208 decrypts the encrypted user data within the virtual machine utilizing the private key corresponding to user 206. Then, at 236, virtual machine initialization manager 208 replaces the encrypted user data with the decrypted user data in the virtual machine. Afterward, at 238, virtual machine initialization manager 208 processes the decrypted user data in the virtual machine to perform the service in the cloud environment. Further, at 240, virtual machine initialization manager 208 configures the network for the service, task, or function. Furthermore, at 242, virtual machine initialization manager 208 runs the virtual machine to provide the service, task, or function in the cloud environment.

Figure 3A:
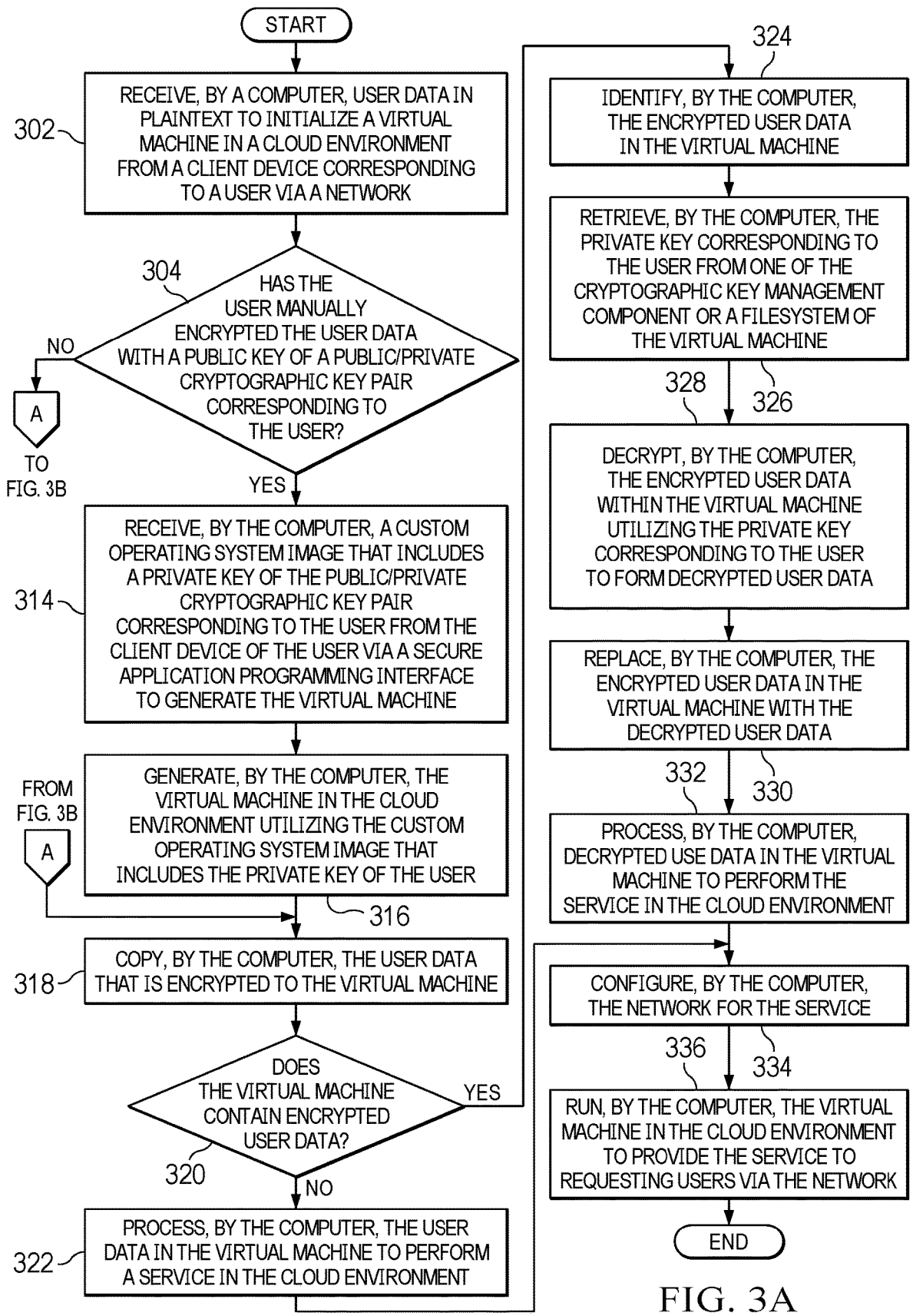
FIGS. 3A-3B are a flowchart illustrating a process for user data security during virtual machine initialization in accordance with an illustrative embodiment.
Figure 3B:
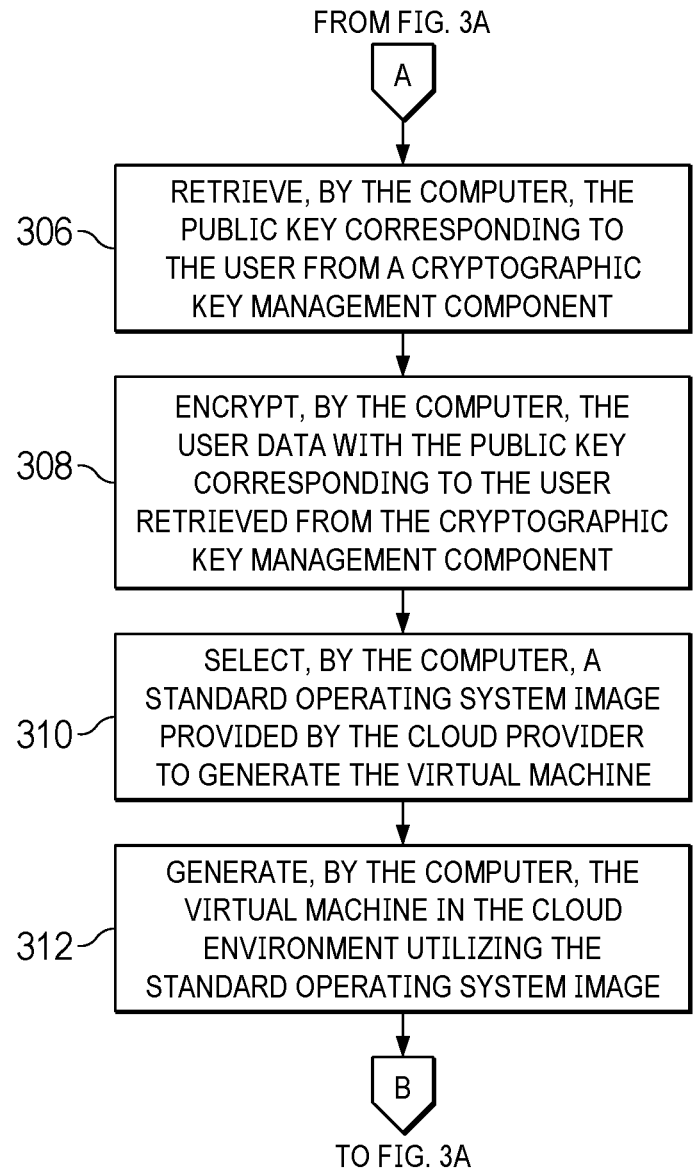

With reference now to FIGS. 3A-3B, a flowchart illustrating a process for user data security during virtual machine initialization is shown in accordance with an illustrative embodiment. The process shown in FIGS. 3A-3B may be implemented in a computer, such as, for example, computer 101 in FIG. 1 or computer 202 in FIG. 2. For example, the process shown in FIGS. 3A-3B may be implemented in virtual machine initialization management code 200 in FIG. 1 or virtual machine initialization manager 208 in FIG. 2.

The process begins when the computer receives user data in plaintext to initialize a virtual machine in a cloud environment of a cloud provider from a client device corresponding to a user via a network (step 302). In response to receiving the user data, the computer makes a determination as to whether the user manually encrypted the user data with a public key of a public/private cryptographic key pair corresponding to the user (step 304).

If the computer determines that the user has not manually encrypted the user data, no output of step 304, then the computer retrieves the public key corresponding to the user from a cryptographic key management component of the computer (step 306). The computer encrypts the user data with the public key corresponding to the user retrieved from the cryptographic key management component (step 308). In addition, the computer selects a standard operating system image provided by the cloud provider of the cloud environment to generate the virtual machine (step 310). The computer generates the virtual machine in the cloud environment utilizing the standard operating system image (step 312). Thereafter, the process proceeds to step 318.

Returning again to step 304, if the computer determines that the user has manually encrypted the user data, yes output of step 304, then the computer requests and receives a custom operating system image that includes a private key of the public/private cryptographic key pair corresponding to the user from the client device of the user via a secure application programming interface to generate the virtual machine (step 314). The secure application programming interface provides a secure communication channel between the client device of the user and the computer. The computer generates the virtual machine in the cloud environment utilizing the custom operating system image that includes the private key of the user (step 316). The custom operating system image copies the private key of the user in a filesystem of the virtual machine during generation of the virtual machine.

The computer copies the user data that is encrypted to the virtual machine (step 318). The computer makes a determination as to whether the virtual machine contains encrypted user data (step 320). If the computer determines that the virtual machine does not contain encrypted user data, no output of step 320, then the computer processes the user data in virtual machine to perform a service in the cloud environment (step 322). Thereafter, the process proceeds to step 334.

If the computer determines that the virtual machine does contain encrypted user data, yes output of step 320, then the computer identifies the encrypted user data in the virtual machine (step 324). Further, the computer retrieves the private key corresponding to the user from one of the cryptographic key management component in response to the computer generating the virtual machine utilizing the standard operating system image provided by the cloud provider or the filesystem of the virtual machine in response to the computer generating the virtual machine utilizing the custom operating system image provided by the user (step 326).

The computer decrypts the encrypted user data within the virtual machine utilizing the private key corresponding to the user to form decrypted user data (step 328). The computer replaces the encrypted user data in the virtual machine with the decrypted user data (step 330). The computer processes the decrypted user data in the virtual machine to perform the service in the cloud environment (step 332).

Furthermore, the computer configures the network for the service (step 334). Moreover, the computer runs the virtual machine in the cloud environment to provide the service to requesting users via the network (step 336). Thereafter, the process terminates.

Thus, illustrative embodiments of the present invention provide a computer-implemented method, computer system, and computer program product for protecting user data during virtual machine initialization to prevent unauthorized access and tampering of the user data. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for user data security, the computer-implemented method comprising:
receiving, by a computer, user encrypted data from a user;
selecting dynamically, by the computer, between a custom operating system image and a standard operating system image, based on the user encrypted data, during initialization boot process of a virtual machine;
retrieving, by the computer, a private key of a public/private cryptographic key pair corresponding to the user;
decrypting, by the computer, the encrypted user data within the virtual machine utilizing the private key corresponding to the user to form decrypted user data;
replacing, by the computer, the encrypted user data in the virtual machine with the decrypted user data; and
processing, by the computer, the decrypted user data in the virtual machine to perform a service in a cloud environment.

2. The computer-implemented method of claim 1 further comprising:
configuring, by the computer, a network for the service; and
running, by the computer, the virtual machine in the cloud environment to provide the service to requesting users via the network.

3. The computer-implemented method of claim 1 further comprising:
receiving, by the computer, user data in plaintext to initialize the virtual machine in the cloud environment from a client device corresponding to the user via a network; and
determining, by the computer, whether the user encrypted the user data with a public key of the public/private cryptographic key pair corresponding to the user in response to receiving the user data.

4. The computer-implemented method of claim 3 further comprising:
responsive to the computer determining that the user encrypted the user data, receiving, by the computer, the custom operating system image that includes the private key of the public/private cryptographic key pair corresponding to the user from the client device of the user via a secure application programming interface that provides a secure communication channel between the client device of the user and the computer;
generating, by the computer, the virtual machine in the cloud environment utilizing the custom operating system image that includes the private key of the user, wherein the custom operating system image copies the private key of the user to a filesystem of the virtual machine; and
copying, by the computer, the user data that is encrypted to the virtual machine.

5. The computer-implemented method of claim 3 further comprising:
responsive to the computer determining that the user has not encrypted the user data, retrieving, by the computer, the public key corresponding to the user from a cryptographic key management component of the computer; and
encrypting, by the computer, the user data with the public key corresponding to the user retrieved from the cryptographic key management component of the computer.

6. The computer-implemented method of claim 5 further comprising:
selecting, by the computer, the standard operating system image;
generating, by the computer, the virtual machine in the cloud environment utilizing the standard operating system image; and
copying, by the computer, the user data that is encrypted to the virtual machine.

7. The computer-implemented method of claim 1, wherein the computer retrieves the private key corresponding to the user from one of a cryptographic key management component in response to the computer generating the virtual machine utilizing the standard operating system image or a filesystem of the virtual machine in response to the computer generating the virtual machine utilizing the custom operating system image.

8. A computer system for user data security, the computer system comprising:
   a communication fabric;
   a storage device connected to the communication fabric, wherein the storage device stores program instructions; and
   a processor connected to the communication fabric, wherein the processor executes the program instructions to:
      receive, from a user, user encrypted data;
      select dynamically between a custom operating system image and a standard operating system image, based on the user encrypted data, during initialization boot process of a virtual machine;
      retrieve a private key of a public/private cryptographic key pair corresponding to the user;
      decrypt the encrypted user data within the virtual machine utilizing the private key corresponding to the user to form decrypted user data;
      replace the encrypted user data in the virtual machine with the decrypted user data; and
      process the decrypted user data in the virtual machine to perform a service in a cloud environment.

9. The computer system of claim 8, wherein the processor further executes the program instructions to:
   configure a network for the service; and
   run the virtual machine in the cloud environment to provide the service to requesting users via the network.

10. The computer system of claim 8, wherein the processor further executes the program instructions to:
    receive user data in plaintext to initialize the virtual machine in the cloud environment from a client device corresponding to the user via a network; and
    determine whether the user encrypted the user data with a public key of the public/private cryptographic key pair corresponding to the user in response to receiving the user data.

11. The computer system of claim 10, wherein the processor further executes the program instructions to:
    receive the custom operating system image that includes the private key of the public/private cryptographic key pair corresponding to the user from the client device of the user via a secure application programming interface that provides a secure communication channel between the client device of the user and the computer system in response to determining that the user encrypted the user data;
    generate the virtual machine utilizing the custom operating system image that includes the private key of the user, wherein the custom operating system image copies the private key of the user to a filesystem of the virtual machine; and
    copy the user data that is encrypted to the virtual machine.

12. The computer system of claim 10, wherein the processor further executes the program instructions to:
    retrieve the public key corresponding to the user from a cryptographic key management component of the computer system in response to determining that the user has not encrypted the user data; and
    encrypt the user data with the public key corresponding to the user retrieved from the cryptographic key management component of the computer system.

13. The computer system of claim 12, wherein the processor further executes the program instructions to:
    select the standard operating system image;
    generate the virtual machine utilizing the standard operating system image; and
    copy the user data that is encrypted to the virtual machine.

14. A computer program product for user data security, the computer program product comprising a computer-readable storage medium having program instructions embodied therewith, the program instructions executable by a computer to cause the computer to perform a method of:
    receiving, from a user, user encrypted data;
    selecting dynamically between a custom operating system image and a standard operating system image, based on the user encrypted data, during initialization boot process of a virtual machine;
    retrieving, by the computer, a private key of a public/private cryptographic key pair corresponding to the user;
    decrypting, by the computer, the encrypted user data within the virtual machine utilizing the private key corresponding to the user to form decrypted user data;
    replacing, by the computer, the encrypted user data in the virtual machine with the decrypted user data; and
    processing, by the computer, the decrypted user data in the virtual machine to perform a service in a cloud environment.

15. The computer program product of claim 14 further comprising:
    configuring, by the computer, a network for the service; and
    running, by the computer, the virtual machine in the cloud environment to provide the service to requesting users via the network.

16. The computer program product of claim 14 further comprising:
    receiving, by the computer, user data in plaintext to initialize the virtual machine in the cloud environment from a client device corresponding to the user via a network; and
    determining, by the computer, whether the user encrypted the user data with a public key of the public/private cryptographic key pair corresponding to the user in response to receiving the user data.

17. The computer program product of claim 16 further comprising:
    responsive to the computer determining that the user encrypted the user data, receiving, by the computer, the custom operating system image that includes the private key of the public/private cryptographic key pair corresponding to the user from the client device of the user via a secure application programming interface that provides a secure communication channel between the client device of the user and the computer;
    generating, by the computer, the virtual machine in the cloud environment utilizing the custom operating system image that includes the private key of the user, wherein the custom operating system image copies the private key of the user to a filesystem of the virtual machine; and
    copying, by the computer, the user data that is encrypted to the virtual machine.

18. The computer program product of claim 16 further comprising:
    responsive to the computer determining that the user has not encrypted the user data, retrieving, by the computer, the public key corresponding to the user from a cryptographic key management component of the computer; and encrypting, by the computer, the user data with the public key corresponding to the user retrieved from the cryptographic key management component of the computer.

19. The computer program product of claim 18 further comprising:
- selecting, by the computer, the standard operating system image;
- generating, by the computer, the virtual machine in the cloud environment utilizing the standard operating system image; and
- copying, by the computer, the user data that is encrypted to the virtual machine.

20. The computer program product of claim 14, wherein the computer retrieves the private key corresponding to the user from one of a cryptographic key management component in response to the computer generating the virtual machine utilizing the standard operating system image or a filesystem of the virtual machine in response to the computer generating the virtual machine utilizing the custom operating system image.

* * * * *